US007346590B2

(12) United States Patent
Critelli et al.

(10) Patent No.: US 7,346,590 B2
(45) Date of Patent: Mar. 18, 2008

(54) METHOD TO ACCOUNT FOR DOMESTIC AND INTERNATIONAL MAIL FEES

(75) Inventors: Michael J. Critelli, Darien, CT (US); Ronald P. Sansone, Weston, CT (US)

(73) Assignee: Pitney Bowes Inc., Stamford, CT (US)

(*) Notice: Subject to any disclaimer, the term of this patent is extended or adjusted under 35 U.S.C. 154(b) by 1182 days.

(21) Appl. No.: 09/999,399

(22) Filed: Nov. 15, 2001

(65) Prior Publication Data

US 2003/0093389 A1 May 15, 2003

(51) Int. Cl.
*G06F 17/00* (2006.01)

(52) U.S. Cl. .................................................... 705/402

(58) Field of Classification Search ..................... 705/1
See application file for complete search history.

(56) References Cited

U.S. PATENT DOCUMENTS 2,957,410 A * 10/1960 Traphagen .................. 101/110
3,750,167 A * 7/1973 Gehman et al. .............. 342/44
4,024,380 A * 5/1977 Gunn ......................... 235/432
4,286,325 A * 8/1981 Dlugos et al. .............. 705/402
4,864,618 A * 9/1989 Wright et al. ................ 380/51
5,262,597 A * 11/1993 Johnson, Jr. ................. 177/50
5,612,889 A 3/1997 Pintsov et al. ......... 364/478.14
5,666,284 A * 9/1997 Kara .......................... 705/402
5,978,781 A 11/1999 Sansone ..................... 705/408
2002/0128857 A1* 9/2002 Lee ................................ 705/1
2004/0039711 A1* 2/2004 Peng .......................... 705/402
2004/0243425 A1* 12/2004 Genzel et al. ................. 705/1

FOREIGN PATENT DOCUMENTS

DE 2803982 * 8/1978

OTHER PUBLICATIONS

Yorgey, Lisa A.; Global delivery in the next century; Oct. 1998; Target Marketing, v21, n10, p. 149; dialog copy 2 pages.*
Shiptrac'r Applications; Vocam Systems Inc., Bloomington, MN; Copyright 1988.*

* cited by examiner

*Primary Examiner*—Akiba K. Robinson-Boyce
(74) *Attorney, Agent, or Firm*—Ronald Reichman; Angelo N. Chaclas

(57) ABSTRACT

The invention makes it easier for the post office to calculate accurately terminal dues by providing information to the post regarding each piece or parcel of mail that crosses an international border. The invention also makes it easier for the post offices to calculate terminal dues by obtaining fee information from mail that is sent internationally. The foregoing is accomplished by placing an indication on the mail that the fees for delivering the mail have been paid or will be paid by a mailer who has an account with the post office; sorting the mail to find international mail; storing the fees that have been paid or will be paid for international mail; reporting the fees that have been paid for international mail to all participating post offices; and calculating the fees that are to be transferred to participating post offices.

16 Claims, 4 Drawing Sheets

METHOD TO ACCOUNT FOR DOMESTIC AND INTERNATIONAL MAIL FEES

FIELD OF THE INVENTION

The invention relates generally to the field of mailing systems and, more particularly, to methods for determining terminal dues.

BACKGROUND OF THE INVENTION

Governments have created post offices for collecting, sorting and distributing letter mail, flats and packages (mail). The post office typically charges mailers for delivering the mail. Mailers may pay the post office for its service by purchasing a stamp, i.e., a printed adhesive label, issued by the post office at specified prices, that is affixed to all mail to show prepayment of postage. Going to the post office to purchase stamps that are going to be placed on mail is a labor-intensive endeavor. Thus, stamps typically are used by individuals, small or home offices, and small businesses.

Another means of payment accepted by the post office is mail that is metered by a postage meter. A postage meter is a mechanical or electromechanical device that maintains, through mechanical or "electronic registers" or "postal security devices," an account of all postage printed, and the remaining balance of prepaid postage, and prints postage postmarks (indicia) or provides postage postmarks (indicia) information to a printer, that are accepted by the post office as evidence of the prepayment of postage. Many postage meters utilize scales to determine the weight of mail. Postage meters may be used by individuals, small or home offices, small businesses, and large businesses.

Post offices and couriers i.e., Federal Express, Airborne, United Parcel Service, DHL, etc. (carriers) provide different services for different types of mail, i.e., first class mail, second class mail, third class mail, priority mail, next day delivery, etc. The cost of the services usually is dependent upon the weight of the mail and the time of expected delivery. Additional charges are applied when mail is delivered from one country to another. Due to various agreements that exist between the posts, the cost of each service varies from country to country. Therefore, in order to apply the proper postage on mail one must know the weight of the mail, the cost of the service, and any extra foreign delivery fee. Sometimes, an individual does not have all of the above information or the proper amount of stamps and has to make a time consuming trip to the post office, during certain postal business hours, to place the proper postage on the mail.

The Universal Postal Union has a complex system that administers contracts between member post offices relating to terminal dues paid between and among different post offices. Terminal dues are the payments made between national postal administrations to cover the costs of handling and delivering international mail. Rates are established by the Universal Postal Union and through bilateral and multilateral agreements. Typically, a post office will charge another post office for the delivery of mail to a recipient within its jurisdiction. For instance, if mail is sent from the United States to the United Kingdom, the United States Post Office will deliver the mail to the Royal Mail, and the Royal Mail will deliver the mail to the recipient. At the end of a predetermined time, the United States Post office and the Royal Mail will tabulate, by weight, all of the mail each post office delivered for the other post office and calculate how much money one post office owes to the other post office.

SUMMARY OF THE INVENTION

This invention overcomes the disadvantages of the prior art by reducing the number of trips an individual has to make to the post office to determine the amount of postage required to send international mail. The invention also makes it easier for the post to calculate accurately terminal dues by providing information to the post office regarding each piece or parcel of mail that crosses an international border. The invention also makes it easier for the post offices to calculate terminal dues by obtaining fee information from mail that is sent internationally. The foregoing is accomplished by placing an indication on the mail that the fees for delivering the mail have been paid or will be paid by a mailer who has an account with the post office; sorting the mail to find international mail; storing the fees that have been paid or will be paid for international mail; reporting the fees that have been paid for international mail to all participating post offices; and calculating the fees that are to be transferred to participating post offices.

An advantage of this invention is that it provides more accurate reporting and checking of the amount of international mail. Thus, each post office pays for the mail actually mailed, and each post office receives the correct revenue for the amount of mail that it processes.

DETAILED DESCRIPTION OF THE PREFERRED EMBODIMENT

Figure 1:
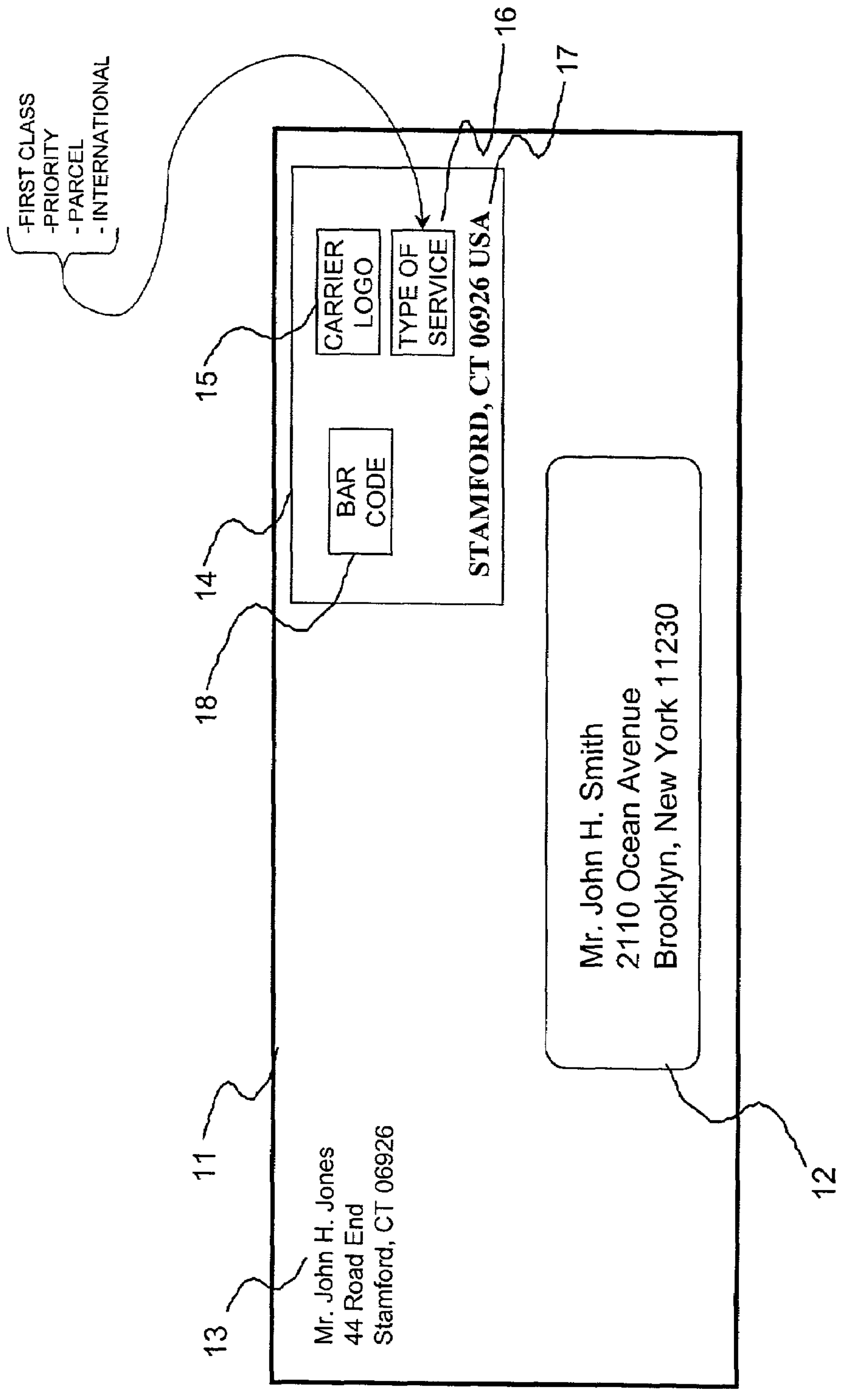
FIG. 1 is a drawing of mail containing a postal indicator in the form of a mailer label.

Referring now to the drawings in detail, and more particularly to FIG. 1, the reference character 11 represents mail that has a recipient address field 12, a sender address field 13, and a postal indicator 14 that may be manufactured from security paper that has an adhesive on its back side so that indicator 14 may be affixed to mail 11. Indicator 14 contains a carrier's logo 15; the type of service requested 16, i.e. first class mail, priority mail, parcel post, international mail, etc.; the place that issued the postal indicator 17, and a two-dimensional bar code 18. Bar code 18 contains the mailer's account number, i.e., the account to which the mailer wants to debit the cost of mailing mail 11; and a unique number that specifically identifies indicator 14. Bar code 18 may also include the type of service desired by the mailer.

Figure 2:
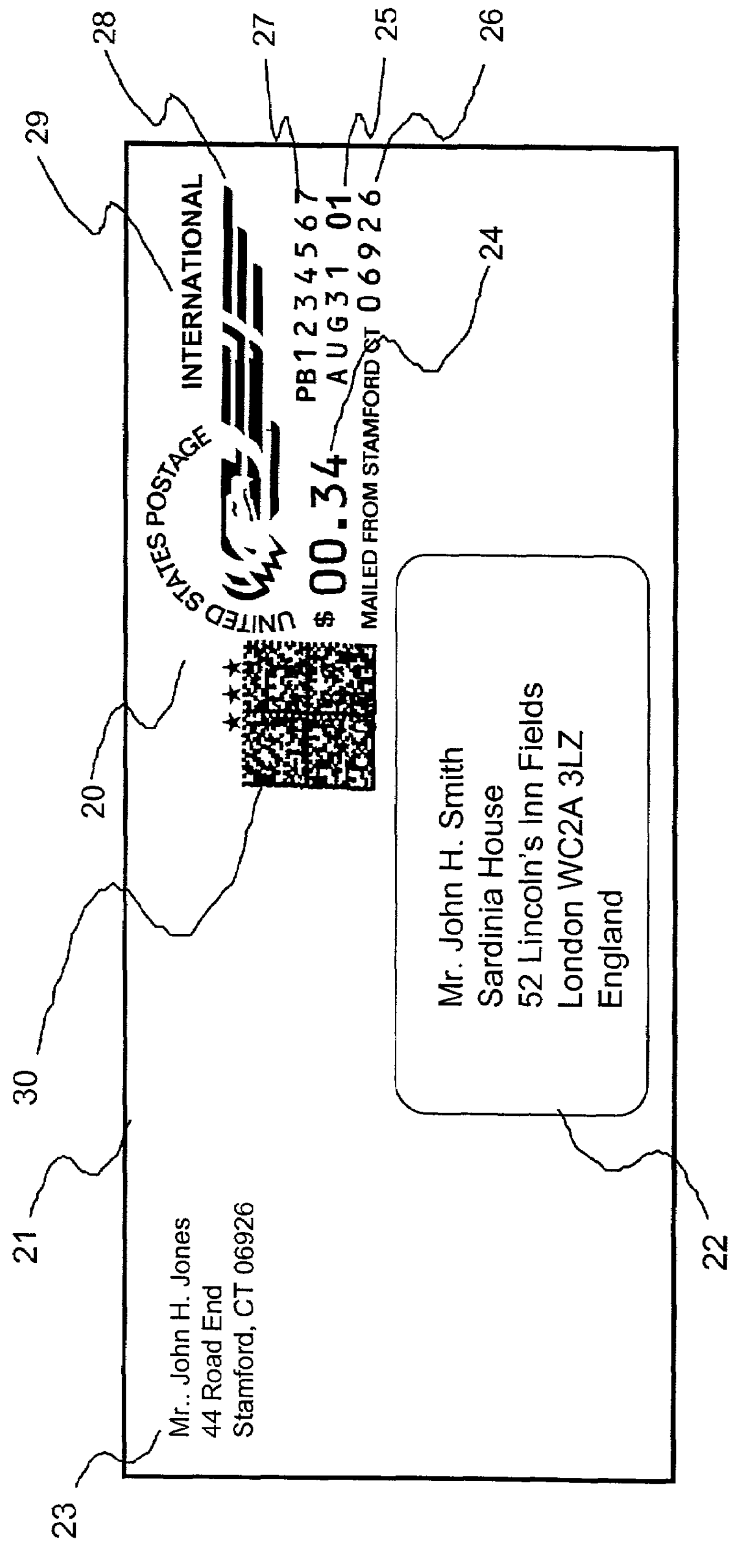
FIG. 2 is a drawing of mail containing a printed postal indicator that represents a mailer in which the mailer has paid a portion of the postage that is due.

FIG. 2 is a drawing of mail containing a printed postal indicator 20 for which the mailer has paid a portion of the postage that is due. Indicator 20 is affixed to mail 21. Mail 21 has a recipient address field 22 and a sender address field 23. Postal indicator 20 may have been made by an electronic postage meter. Indicator 20 contains a dollar amount 24, the date 25 that postal indicator 20 was affixed to mail 21; the place the mail was mailed from 26; the postal meter serial number 27; an eagle 28; the type of mail piece 29, i.e., and a two-dimensional bar code 30. Bar code 30 contains the mailer's account number, i.e., the account to which the mailer wants to debit the added cost of mailing mail 21 that was not included in dollar amount 21, and a unique number that specifically identifies indicator 20. If the mailer knew the total cost of mailing mail 21 to England, the mailer may have included the total cost of mailing in dollar amount 24.

Figure 3:
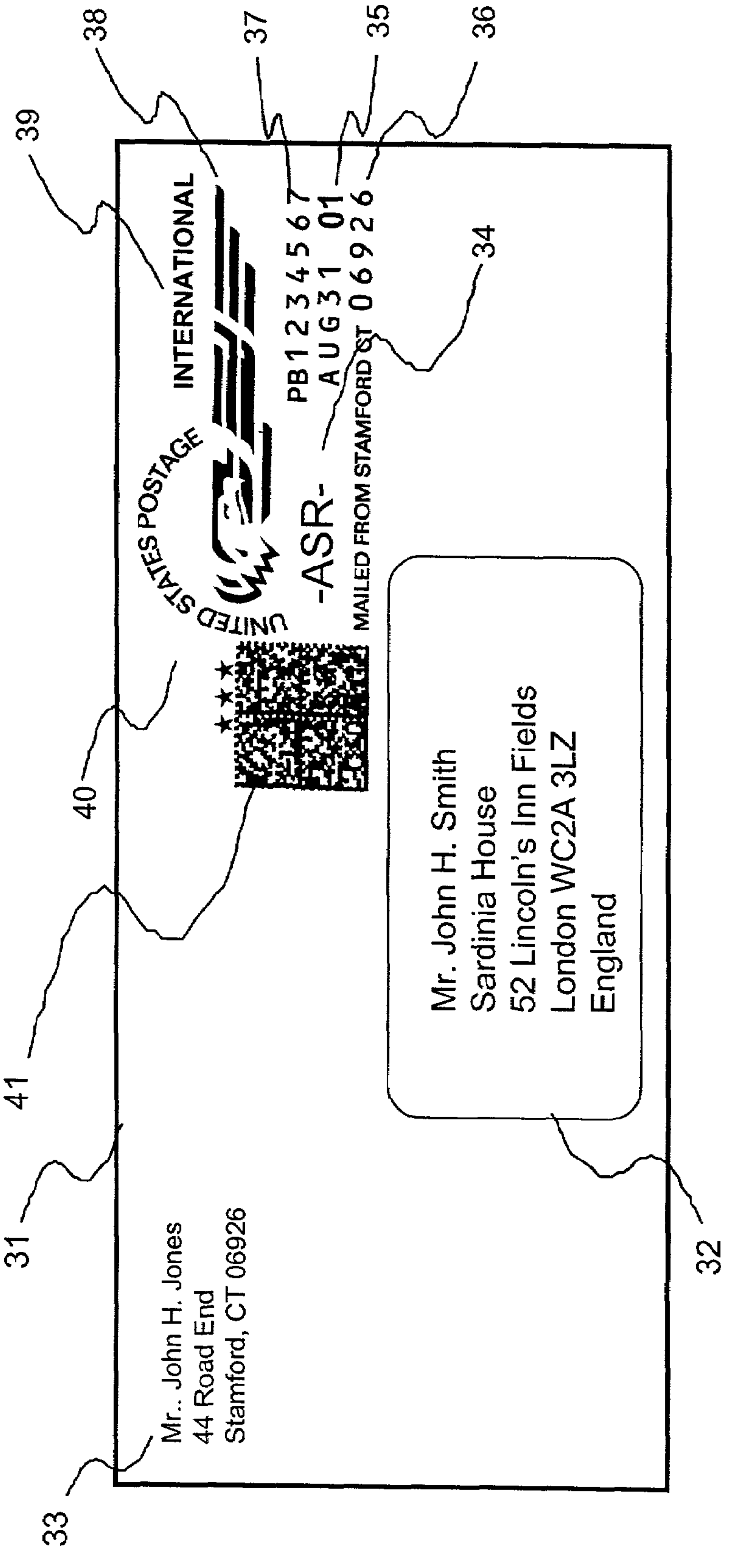
FIG. 3 is a drawing of mail containing a printed postal indicator that represents a mailer in which the mailer is going to debit their account for the postage that is due.

FIG. 3 is a drawing of mail containing a printed postal indicator that represents mail in which the mailer is going to debit their account for the postage that is due. Indicator 40 is affixed to mail 31. Mail 31 has a recipient address field 32 and a sender address field 33. Postal indicator 40 may have been made by an electronic postage meter. Indicator 40 contains an As Services Rendered (ASR) 34 mark that indicates the cost of mailing mail 31 that will be charged to the mailer's account; the date 35 that postal indicator 40 was affixed to mail 31; the place the mail was mailed from 36; the postal meter serial number 37; an eagle 38; the type of mail piece 39, i.e., and a two-dimensional bar code 41. Bar code 41 contains the mailer's account number, i.e., the account to which the mailer wants to debit the cost of mailing mail 31 and a unique number that specifically identifies indicator 40.

Figure 4:
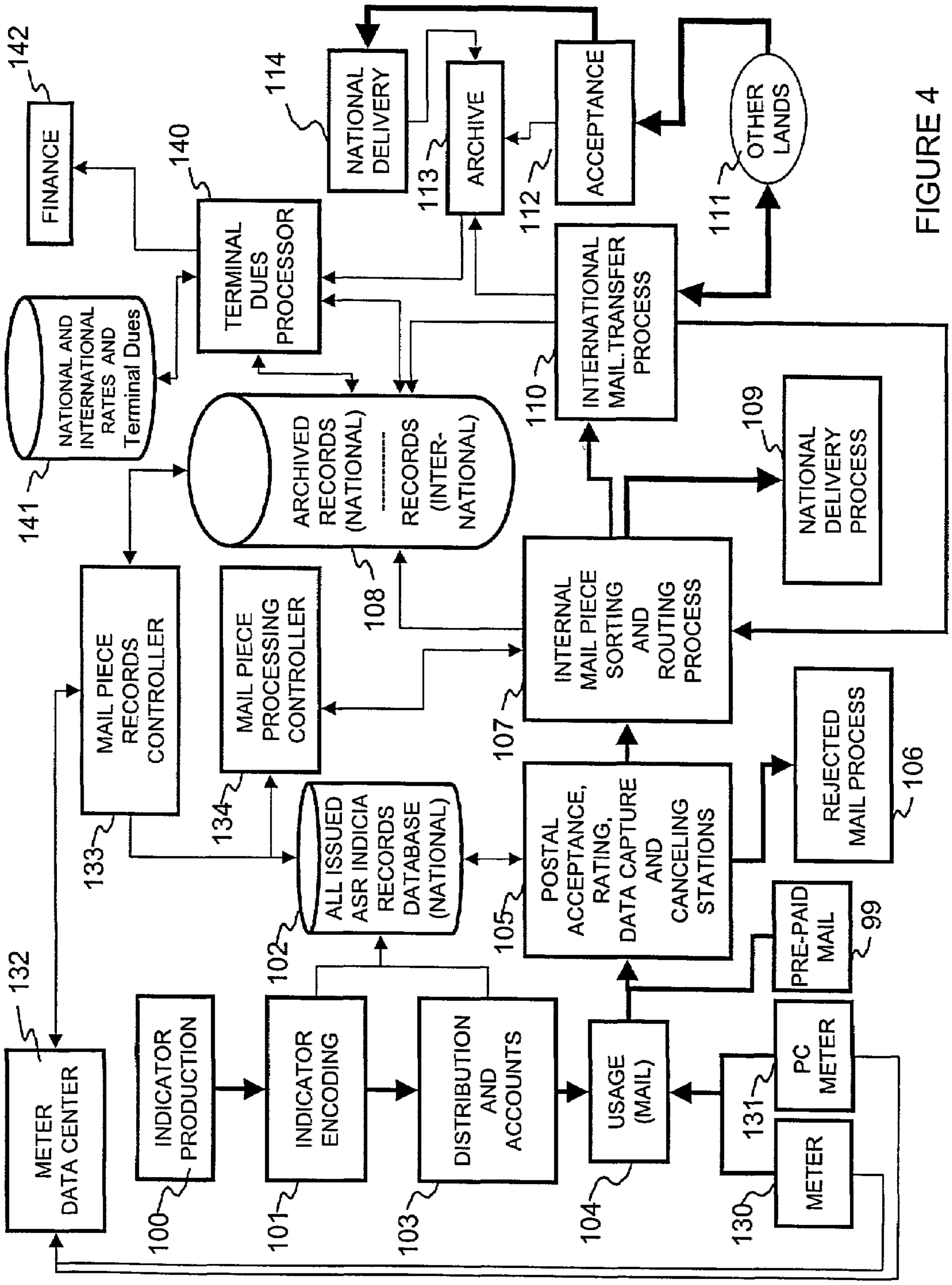
FIG. 4 is a block diagram illustrating the process of using postal indicators.

FIG. 4 is a block diagram illustrating the process of using postal indicators. Block 100 represents the production of postal indicators 14. Postal indicators 14 are printed on security paper that is assigned and imprinted with a mailer account number and a unique number that specifically represents each indicator 14 in step 101. When the unique number is issued for each postal indicator 14, the issuance of the unique number is reported to the "all issued and used As Services Rendered (ASR) national data base" 102, where a record is created, specifically referenced to the issued unique number for a particular mailer account number. The record is a proof of validity of postal indicators having an issued unique number for a particular mailer account number, and the proof is provided when data base 102 is consulted. The same record will be charged to the mailer's account when the postal indicator having the same unique number for a particular mailer account number is canceled, and that altered record will no longer provide a proof of validity of any future indicator.

In step 103, it is shown that indicators 14 are delivered to local post offices for distribution and obtaining mailer's accounts. After a mailer has requested a plurality of unique identifiers for a credit card account or other account which they have set up with the carrier, the issued indicators 14 are reported to data base 102. In step 99, a mailer may use prepaid adhesive indicators purchased from the post offices to fully pay for delivery of the mail to a foreign country. After the mailer uses an indicator 14 bearing a unique number for mailing mail 11, as in step 104, the mail is collected and rated at various post office recording stations using data capture techniques and processed by the accepting post office in step 105. As part of the mail accepting procedures in step 105, indicator 14 is examined and compared to data in data base 102, to determine whether the indicator used is legitimate. In the acceptance process, a code reader is used to identify the unique number and account number on indicator 14. It is understood that, if the account number and/or unique number is produced with an invisible ink, a special light source will be needed to make the account number and/or unique number visible to the code reader. The identified account number and unique number is reported to data base 102 and a proof of validity of indicator 14 is requested. If data base 102 has a record showing the issuance of the unique number for the particular account number used and that the unique number has not been canceled, then identifier 14 is considered legitimate. In that case, identifier 14 has passed the verification process, and the mail is accepted for further processing, with identifier 14 being canceled in step 105. It is preferred that the cancellation mark is produced with a visible ink in a manner that a "canceled" postal indicator is easily distinguishable from an unused one and that a "cancelled" postal indicator" will still be able to be read.

When the indicator 14 bearing a unique number for a particular user account number is canceled in step 105, a request is made to data base 102 to alter the record that is specifically related to the unique number being canceled. The altered record will contain the date and time of cancellation, the cost of the selected services derived from the weighing of the mail, and no longer provide a proof of validity when data base 102 is consulted. The cost for mailing the mail determined in step 105 will be charged to the mailer's credit card account; or, periodically, the mailer will be sent a bill for the services provided. The mailer cost information will be transmitted to data center 132 via data base 102 and controller 133.

However, if the acceptance procedures in step 105 fail to yield a proof of validity of indicator 14, the mail will be sent to rejected mail process 106 where the mail will be returned to the sender or placed in the dead mail file.

The mail that step 105 determines has legitimate identifiers 14 is sent to step 107 for internal sorting and routing from place to place. Step 107 will note the date and time the mail is at each step in the process. The foregoing information will be sent to archive 108. Then the physical mail is delivered nationally in step 109 or delivered internationally in step 110. Nationally, at the recipient's delivery post office, the mail will be scanned during the last sorting process where the date and time of sorting as well as other information identifying the mail, i.e., unique number, will be captured and stored in archive 108. At the last facility before the mail is transferred internationally in step 110, the mail will be scanned where the date and time of sorting as well as other information identifying the mail, i.e., unique number, will be captured and stored in archive 108.

At this point, the physical mail will be delivered to other lands 111. Then the mail will go to step 112 for sorting and routing in the country that the recipient is located. Step 112 will note the date and time the mail is at each step in the process. The foregoing information will be sent to archive 113. Then the physical mail is delivered nationally in step 114. At the international recipient's delivery post office, the mail will be scanned during the last sorting process where the date and time of sorting as well as other information identifying the mail, i.e., unique number, will be captured and stored in archive 113.

Electronic postage meter 130 or personal computer meter 131 may be used to print indicators 20 (FIG. 2) and 40 (FIG. 3). During a communication between postage meter 130 or personal computer meter 131 with data center 132, it will be indicated that meter 130 or meter 131 printed indicators 20 and/or 40. Meters 130 and/or 131 will also transmit all of the information contained in indicators 20 and 40 to data center 132. Data center 132 will transmit the information contained in indicators 20 and 40 to mail records controller 133. Mail records controller 133 will transmit the information it receives from data center 132 to data base 102, where a record is created, specifically referenced to the issued unique number for a particular meter 130 or 131 account number. The record is a proof of validity of postal indicators having an issued unique number for a particular meter, and the proof is provided when data base 102 is consulted. The same record less any amount previously charged to the meter will be charged to the meter 130 or meter 131 when the postal indicator having the same unique number for a particular meter is canceled and that altered record will no longer provide a proof of validity of any future indicator.

Postal terminal dues processor 140 is coupled to archive 108, national, international and terminal dues data base 141, finance 142 and archives 108 and 113. Processor 140 will poll archive 108 and archives 113 in other lands 111 (United Kingdom, France, German, Japan, etc.) 111 and utilize data base 141 to determine the value of the mail processed by the receiving countries from the sending countries. Then processor 140 will determine how much money each country owes to the other countries. At agreed upon intervals, finance 142 will issue terminal dues statements to all participating countries and arrange for the transmission of funds from one country to another. The participating countries may also use the data received and compare it to their actual costs for delivering mail that originates in specific foreign countries. Thus, the data obtained and the costs associated for delivering foreign mail may be used to negotiate new terminal dues charges between the domestic and foreign carriers.

The above specification describes a new and improved method for controlling domestic and international mail. It is realized that the above description may indicate to those skilled in the art additional ways in which the principles of this invention may be used without departing from the spirit. Therefore, it is intended that this invention be limited only by the scope of the appended claims.

What is claimed is:

1. A method to account for domestic and international mail fees, said method comprising the steps of:

establishing indicator accounts that senders of mail use for carrier services;

issuing indicators that uniquely identify mail, wherein the indicators are labels that are affixed to the mail and specify the services requested to be performed by the carrier and the sender of the mail;

scanning the face of the mail including the indicator to find international mail;

determining the fees for all participating posts to deliver international mail;

storing the fees for all participating posts that have been paid or will be paid for international mail; and processing the mail if the indicator was issued to the sender and not heretofore used; and sending the recipient's name and address to the foreign countries' official name and address data base to establish if the mail is deliverable to the recipient.

2. The method claimed in claim 1, further including the step of:

reporting the fees that have been paid for international mail to all the participating posts.

3. The method claimed in claim 2, further including the step of:

calculating the fees that are to be transferred to the participating posts.

4. The method claimed in claim 1, wherein the requested services may be charged to the sender's credit card.

5. The method claimed in claim 1, wherein the determining step further includes the steps of:

weighing the mail;

calculating the amount of monies due the carrier using the requested services and the weight of the mail; and debiting a sender's account for the calculated services.

6. The method claimed in claim 5, further including the step of: canceling the indicator.

7. The method claimed in claim 1, wherein the determining step further includes the steps of:

deciding the size of the mail;

calculating the amount of monies due the carrier using the requested services and the size of the mail; and debiting a sender's account for the calculated services.

8. The method claimed in claim 1, wherein the determining step further includes the steps of:

deciding the cost of the requested service; and charging the requested service to the mailer.

9. The method claimed in claim 1, wherein the processing step further includes the steps of:

tracking the mail; and routing the mail to the recipient.

10. The method claimed in claim 1, wherein the indicator is printed on security material.

11. The method claimed in claim 1, wherein indicators on the labels are printed by an electronic postage meter.

12. The method claimed in claim 1, wherein indicators on the labels are printed by a personal computer meter.

13. The method claimed in claim 1, further including the step of:

collecting the costs of all mail that is going to be delivered to a foreign country.

14. The method claimed in claim 1, further including the step of:

determining the costs that the foreign carrier charges the domestic carrier to deliver the mail in the foreign country.

15. The method claimed in claim 1, further including the step of:

increasing the terminal dues for delivering mail addressed to a destination in a foreign country if the foreign carrier's periodic cost for delivering the mail is greater than expected.

16. The method claimed in claim 1, further including the step of:

using the foreign and domestic carriers' actual costs to deliver the mail to negotiate new terminal dues charges between the domestic and foreign carriers.

* * * * *